United States Patent
Han

(10) Patent No.: US 11,960,682 B2
(45) Date of Patent: Apr. 16, 2024

(54) TOUCH SENSING DEVICE AND COORDINATE CORRECTION METHOD

(71) Applicant: LX Semicon Co., Ltd., Daejeon (KR)

(72) Inventor: Chan Hee Han, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/075,255

(22) Filed: Dec. 5, 2022

(65) Prior Publication Data

US 2023/0205368 A1    Jun. 29, 2023

(30) Foreign Application Priority Data

Dec. 24, 2021   (KR) .................. 10-2021-0186738

(51) Int. Cl.
  *G06F 3/041* (2006.01)

(52) U.S. Cl.
  CPC ................... *G06F 3/04186* (2019.05)

(58) Field of Classification Search
  CPC ............... G06F 3/04186; G06F 3/0418
  See application file for complete search history.

(56) References Cited

U.S. PATENT DOCUMENTS

| | | | | |
|---|---|---|---|---|
| 10,963,098 | B1* | 3/2021 | Zoubir | G06F 3/04186 |
| 2007/0146325 | A1* | 6/2007 | Poston | G06F 3/038 |
| | | | | 345/163 |
| 2011/0285665 | A1* | 11/2011 | Matsumoto | G06F 3/0445 |
| | | | | 345/174 |
| 2013/0002600 | A1* | 1/2013 | McCracken | G06F 3/04186 |
| | | | | 345/173 |
| 2013/0271487 | A1* | 10/2013 | Lincoln | G06F 3/0488 |
| | | | | 345/157 |
| 2013/0278550 | A1* | 10/2013 | Westhues | G06F 3/0446 |
| | | | | 345/173 |
| 2013/0342468 | A1* | 12/2013 | Hekstra | G06F 3/0418 |
| | | | | 345/173 |
| 2014/0078087 | A1* | 3/2014 | Ho | G06F 3/0412 |
| | | | | 345/173 |
| 2014/0192058 | A1* | 7/2014 | Kodama | G06T 11/203 |
| | | | | 345/442 |
| 2015/0062021 | A1* | 3/2015 | Skaljak | G06F 3/038 |
| | | | | 345/173 |
| 2017/0090672 | A1* | 3/2017 | Tennant | G06F 3/0418 |
| 2021/0191597 | A1* | 6/2021 | Han | G06F 3/0443 |
| 2021/0191598 | A1* | 6/2021 | Lim | G06F 3/04883 |
| 2021/0349627 | A1* | 11/2021 | Chang | G06F 3/0482 |
| 2022/0283702 | A1* | 9/2022 | Tanaka | G06F 3/04186 |
| 2023/0045137 | A1* | 2/2023 | Yao | G06F 3/0488 |
| 2023/0051541 | A1* | 2/2023 | Kim | G06F 3/04166 |

FOREIGN PATENT DOCUMENTS

| | | |
|---|---|---|
| JP | 2012198607 A | 10/2012 |
| KR | 20110005572 A | 1/2011 |
| KR | 20140057977 A | 5/2014 |

* cited by examiner

*Primary Examiner* — Ibrahim A Khan
(74) *Attorney, Agent, or Firm* — POLSINELLI PC

(57) ABSTRACT

The present disclosure relates to a touch sensing device and a coordinate correction method, and more particularly, to a technique of determining a degree, to which a drawn line is curved (a straight line/a curved line), according to gradient values of straight lines that can be generated by touch coordinates and adaptively correcting the coordinates.

17 Claims, 8 Drawing Sheets

Original    Smoothing

Original    Smoothing

TOUCH SENSING DEVICE AND COORDINATE CORRECTION METHOD

CROSS REFERENCE TO RELATED APPLICATION

This application claims priority from Republic of Korea Patent Application No. 10-2021-0186738 filed on Dec. 24, 2021, which is hereby incorporated by reference in its entirety.

BACKGROUND

1. Field of Technology

The present disclosure relates to a touch sensing device and a coordinate correction method.

2. Related Technology

Recently, display devices having a touch screen panel that allows a user to apply a touch to a screen through a finger or a touch pen, recognizes and outputs the touch have been widely used. Display devices that receive input information by touching a screen may include a touch sensing device that receives a signal from a touch panel and detects the presence or absence of a touch input and touch coordinates corresponding to a touch position.

However, when a user performs touch drawing on the screen using his/her finger or a touch pen, noise may be included in touch input due to user's unintentional hand tremor or other external factors, and thus there may be a problem in that the result of touch drawing intended by the user is not obtained.

In order to solve the problem of noise included in touch input, smoothing for correcting touch coordinates may be used. However, if touch coordinates for a touch input are excessively corrected, whereby lines are excessively smoothed, even though the lines may be smooth, the lines may be generated in a size or at a location that is not intended by the user. Accordingly, this may give the user an unsatisfactory close contact feeling and this may lead to inconvenience when using the display device.

In view of such circumstances, an object of the present embodiment is to solve the problem that a line drawn by a user is uniformly smoothed regardless of the shape of the line and thus a line having a different size or shape than intended.

The discussions in this section are only to provide background information and does not constitute an admission of prior art.

SUMMARY

To accomplish the aforementioned object, in an aspect, the present disclosure provides a touch sensing device including: a coordinate calculation circuit for calculating touch coordinates for a single touch input generated on a touch screen panel; an indicator generation circuit for generating an angle indicator by calculating a gradient value of a straight line created by connecting the two neighboring touch coordinates among the touch coordinates; and a coordinate correction circuit for generating a filtered coordinate for each touch coordinate by correcting the touch coordinate according to a value of the angle indicator.

To accomplish the aforementioned object, in another aspect, the present disclosure provides a touch sensing device including: a coordinate calculation circuit for calculating touch coordinates for a single touch input generated on a touch screen panel; an indicator generation circuit for generating an angle indicator by calculating a gradient value of a straight line created by connecting the two neighboring touch coordinates; and a coordinate correction circuit for generating a filtered coordinate by correcting a second coordinate using a first coordinate corresponding to a reference coordinate, a first weight to be multiplied by the first coordinate, the second coordinate belonging to the touch coordinates, and a second weight to be multiplied by the second coordinate, wherein values of the first weight and the second weight vary according to a value of the angle indicator.

To accomplish the aforementioned object, in still another aspect, the present disclosure provides a coordinate correction method including: calculating touch coordinates for a single touch input generated on a touch screen panel; generating an angle indicator by calculating a gradient value of a straight line created by connecting two neighboring touch coordinates; and generating an angle filtered coordinate for each touch coordinate by correcting the touch coordinate according to a value of the angle indicator.

As described above, according to the present embodiment, it is possible to improve a degree of user's feeling of close contact with touch and a degree of smoothness of a line drawn by the user by varying a degree of coordinate correction depending on a degree to which the line is straight or curved.

DETAILED DESCRIPTION OF EMBODIMENTS

Figure 1:
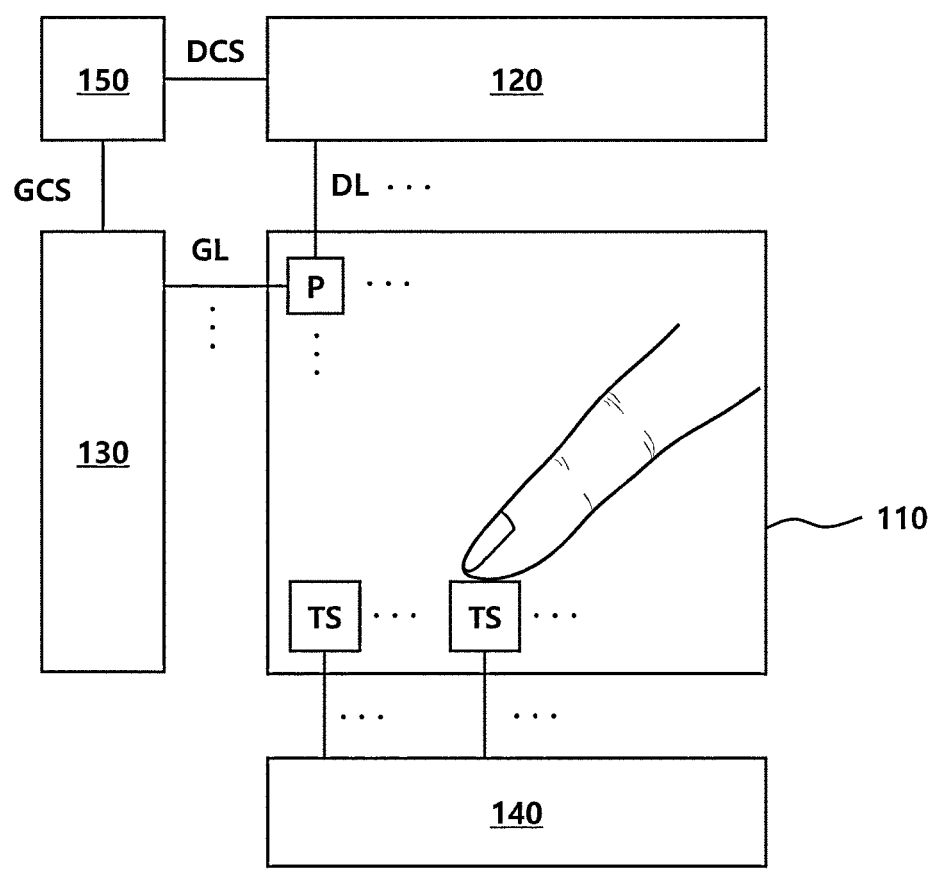
FIG. 1 is a block diagram of a display device according to the present embodiment.

FIG. 1 is a block diagram of a display device according to the present embodiment.

Referring to FIG. 1, the display device 100 includes a panel 110, a data driver 120, a gate driver 130, a touch sensing device 140, a data processor 150, and the like.

At least one of the data driver 120, the gate driver 130, the touch sensing device 140, and the data processor 150 may be referred to as a display driver. For example, the data driver 120 may be referred to as a display driver, and a driver including the data driver 120 and the touch sensing device 140 may be referred to as a display driver. One driver may be included in another driver. For example, the data driver 120 may be included in the touch sensing device 140. Alternatively, the gate driver 130 may be included in the data driver 120. According to an embodiment, only some components of one driver may be included in another driver.

The data driver 120 may drive data lines DL connected to pixels P, and the gate driver 130 may drive gate lines GL connected to the pixels P. In addition, the touch sensing device 140 may drive touch sensors TS disposed on the panel 110.

The data driver 120 may supply a data voltage to the data lines DL to display an image in pixels P of the panel 110. The data driver 120 may include at least one data driver integrated circuit which may be connected to a bonding pad of the panel 110 through tape automated bonding (TAB) or a chip on glass (COG) method, may be directly formed on the panel 110, or may be formed by being integrated into the panel 110 in some cases. In addition, the data driver 120 may be implemented as a chip on film (COF).

The data driver 120 may receive image data and a data control signal DCS from the data processor 150. The data driver 120 may generate a data voltage according to a grayscale value of each pixel indicated by the image data and drive each pixel.

The gate driver 130 may supply scan signals to the gate lines GL to turn on/off transistors disposed in the pixels P. The gate driver 130 may be positioned on only one side of the panel 110 as shown in FIG. 1 or may be divided into two and positioned on both sides of the panel 110 according to a driving method. In addition, the gate driver 130 may include at least one gate driver integrated circuit which may be connected to the bonding pad of the 110 through tape automated bonding (TAB) or chip-on-glass (COG) method, may be directly formed on the panel 110 by being implemented as a gate in panel (GIP), or may be formed by being integrated into the panel 110 in some cases. In addition, the gate driver 130 may be implemented as a chip-on-film (COF).

The gate driving device 130 may receive a gate control signal GCS from the data processor 150. The gate control signal GCS may include a plurality of clock signals. In addition, the gate driver 130 may generate scan signals using the clock signals and supply the scan signals to the gate lines GL.

The panel 110 may include a display panel and may further include a touch screen panel (TSP). Here, the display panel and the touch screen panel may share some components with each other. For example, a touch sensor TS for sensing a touch in the touch screen panel may be used as a common electrode to which a common voltage is supplied in the display panel (when the display panel is a liquid crystal display (LCD) panel). As another example, the touch sensor TS may be used as a cathode to which a base voltage is supplied in the display panel (when the display panel is an organic light emitting diode (OLED) panel). In view of the fact that the display panel and the touch screen panel share some components with each other, the panel 110 is also called an integrated panel, but the present invention is not limited thereto.

In addition, although an in-cell type panel is known as a form in which a display panel and a touch screen panel are integrally combined, this is only an example of the aforementioned panel 110 and the panel to which the present invention is applied is not limited to such an in-cell type panel.

Meanwhile, a plurality of touch sensors TS is disposed in the panel 110, and the touch sensing device 140 may drive the touch sensors TS using a touch driving signal. In addition, the touch sensing device 140 may generate sensing values for the touch sensors TS according to reaction signals formed in the touch sensors TS in response to the touch driving signal. In addition, the touch sensing device 140 may calculate touch coordinates of an object 10 using the sensing values for the plurality of touch sensors TS disposed on the panel 110, and the calculated touch coordinates may be transmitted to other devices, for example, a host, and used thereby.

The touch sensing device 140 may transmit/receive signals to/from the object through the touch sensors TS. The touch sensing device 140 may calculate touch coordinates using sensing values for a plurality of touch electrodes EL disposed in the panel 110, and the calculated touch coordinates are transmitted to other devices, for example, the host, and used thereby.

The data processor 150 may control timing of each of the drivers 120 and 130 through the control signals GCS and DCS. In this respect, the data processor 150 may be referred to as a timing controller.

Figure 2:
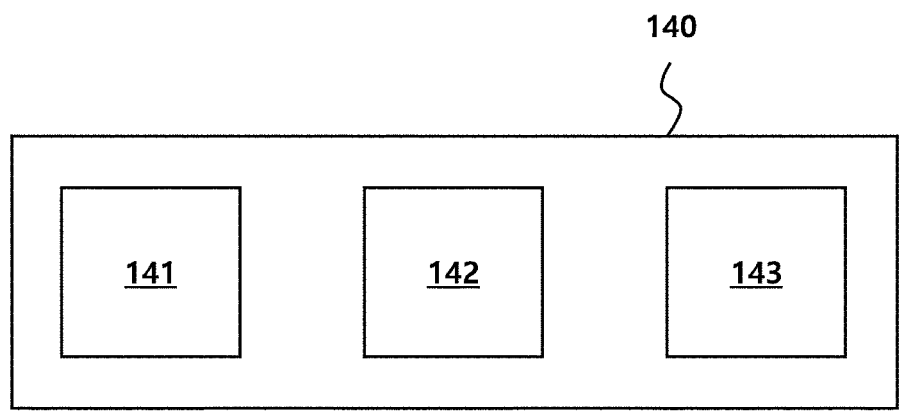
FIG. 2 is a diagram illustrating a configuration of a touch sensing device according to the present embodiment.

FIG. 2 is a diagram illustrating a configuration of the touch sensing device according to the present embodiment.

The touch sensing device 140 according to the present embodiment may include a coordinate calculation circuit 141, an indicator generation circuit 142, and a coordinate correction circuit 143.

The coordinate calculation circuit 141 may calculate touch coordinates for a single touch input generated on the touch panel. The touch input may include press, drawing, release, and the like applied by a user's finger to the touch screen panel using a touch pen or the like. Press of touch input may mean a stage in which an object for touch input touches the touch screen panel to apply a touch. Drawing may mean a stage in which the object touching on the touch panel is dragged without being separated from the touch panel to continuously apply the touch. Release may mean a stage in which the touch input is terminated by releasing the object from the touch panel. Here, a single touch input may mean a touch input composed of press, drawing, and release, and, in brief, may mean a touch input applied with an object touching the touch panel.

The coordinate calculation circuit 141 may receive the sensing values for the plurality of touch sensors TS disposed in the touch screen panel and calculate touch coordinates using the received values.

The indicator generation circuit 142 may generate an angle indicator by calculating gradient values of straight lines generated by connecting one of the touch coordinate and another coordinate for each of the touch coordinates.

Calculation of an angle indicator will be described in detail with reference to FIG. 4.

The indicator generation circuit 142 may select touch coordinates spaced apart within a predetermined distance range from among the touch coordinates, and then calculate gradient values using the selected touch coordinates to generate an angle indicator. If only touch coordinates of one frame interval are used, the reliability of gradient characteristics of straight lines and curves included in angle indicators is low, and thus it may be difficult to distinguish between a straight line and a curve. Accordingly, after selecting touch coordinates spaced apart within a predetermined distance range, an angle indicator may be generated through the selected touch coordinates.

The distance range for selecting touch coordinates is not particularly limited, but, for example, touch coordinates spaced apart by a distance within the range of 0.9 to 1.1 mm among the touch coordinates may be selected (sampled) and an angle indicator may be calculated using the same.

The coordinate correction circuit 143 may generate filtered coordinates for the touch coordinates by correcting the touch coordinates according to the angle indicator values.

The coordinate correction circuit 143 may receive the angle indicator values generated by the indicator generation circuit 142 and determine a degree to which coordinates are corrected differently. That is, a degree to which coordinates are corrected may decrease as an angular indicator value increases and may increase as the angle indicator value increases. A large correction degree may mean that a distance between coordinates before and after being corrected is long, and a small correction degree may mean that the distance between the coordinates before and after being corrected is short.

From a different point of view, the coordinate correction circuit 143 according to the present embodiment may create filtered coordinates obtained by correcting a second coordinate using a first coordinate belonging to touch coordinates, a first weight multiplied by the first coordinate, the second coordinate belonging to the touch coordinates, and a second weight multiplied by the second coordinate, and may vary the values of the first weight and the second weight according to an angle indicator value.

That is, the first coordinate and the second coordinate may be sequentially input touch coordinates, or may be touch coordinates spaced apart by a predetermined distance range. Then, the filtered coordinates may be created by multiplying the first coordinate and the second coordinate by the first weight and the second weight.

The sum of the first weight and the second weight is 1, the larger the value of the angle indicator, the smaller the first weight and the larger the second weight, and the smaller the value of the angle indicator, the larger the first weight and the smaller the second weight.

That is, the second weight is a value multiplied by the filtered second coordinate, and a coordinate correction degree decreases as the second weight increases and increases as the second weight decreases.

The coordinate correction circuit 143 creates touch coordinates by a single touch input, and filtered coordinates created using the touch coordinates may be output on the display panel in the order of generation and drawn as one line.

The touch sensing device 140 according to the present embodiment may further include a transmission circuit (not shown).

The transmission circuit may transmit the filtered coordinates created by the touch sensing device 140 to the host (not shown), and the host may receive the filtered coordinates and use the same.

Figure 3A:
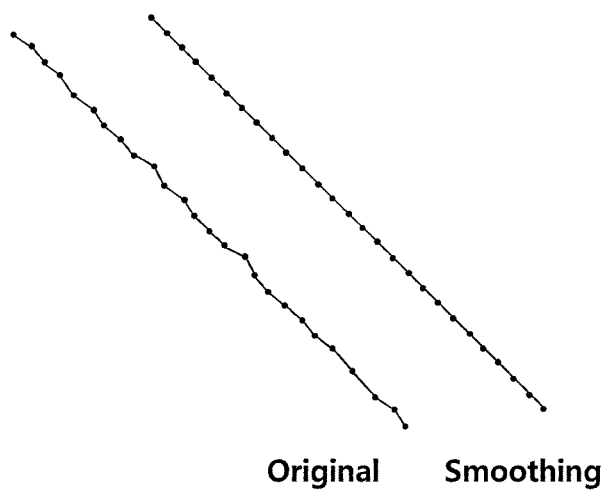
FIGS. 3A and 3B are diagrams illustrating coordinate correction according to the present embodiment.
Figure 3B:
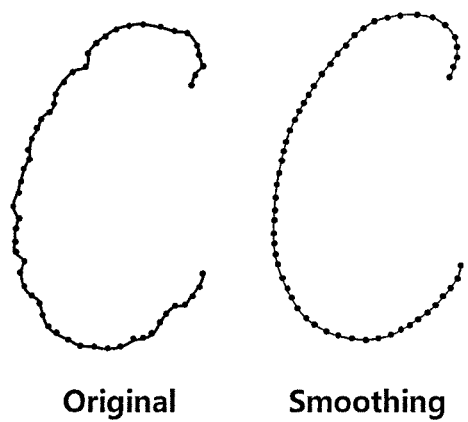

FIGS. 3A and 3B are diagrams illustrating coordinate correction according to the present embodiment.

When a user draws a line by applying a touch to the touch screen panel, the line may be distorted due to jitter noise of a high frequency component. In addition, line drawing may not be performed cleanly due to user's hand tremor or other external environments, and line drawing may include user's unwanted tremor. In order to solve this problem, smoothing may be performed by correcting touch coordinates corresponding to line drawing, as shown in FIGS. 3A and 3B.

A degree to which a drawn line is smoothed may be proportional to the linearity of a straight line, inversely proportional to the linearity of a curve, and inversely proportional to latency. That is, as the degree to which a line is smoothed increases, a straight line can be drawn as a straight line, a curve can be drawn as a smooth curve, and latency, which means delay time or waiting time, may increase.

When a user draws a line by touch input, drawing performance evaluation may be performed differently for a straight line and a curve. Specifically, the user is sensitive to the smoothness of a line when drawing a straight line and sensitive to closeness between user's touch input and a result of touch when drawing a curve, in general. However, when touch coordinate correction is performed in the same manner for a straight line and a curve as shown in FIGS. 3A and 3B, a result of touch input may not be derived as desired by the user. That is, if touch coordinates are corrected for a curve and smoothing is strongly applied, the curve may be drawn smaller than intended by the user to smooth the curve.

In order to solve this problem, it is necessary to smooth straight lines and curves created by user's drawing by correcting touch coordinates differently.

Coordinates corrected according to the present embodiment may be referred to as angle filtered coordinates.

Figure 4:
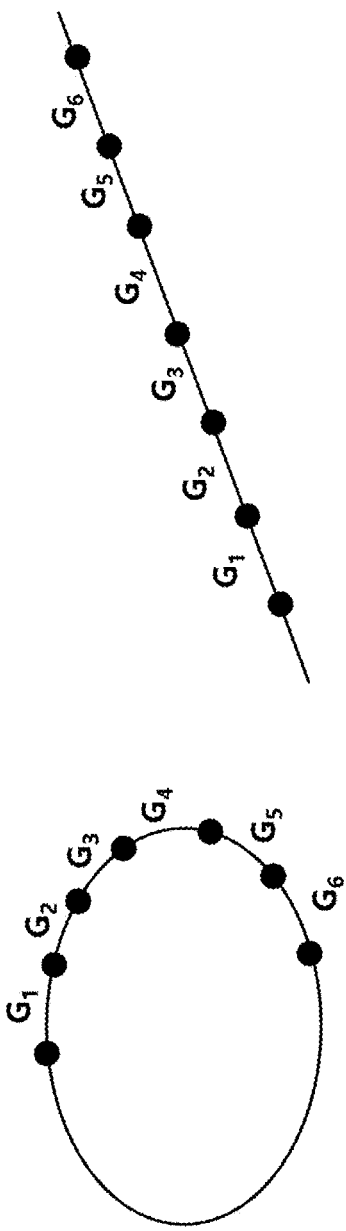
FIG. 4 is a diagram illustrating indicator calculation according to the present embodiment.

FIG. 4 is a diagram illustrating indicator calculation according to the present embodiment.

As shown in FIG. 4, touch input of a user may include a curve like a circle or may be drawn as a straight line. If seven touch coordinates are input as shown in FIG. 4, each touch coordinate is connected to a neighboring touch coordinate and thus six gradient values $G_1, G_2, \ldots, G_6$ may be created. The gradient values of straight lines may be subtracted from each other and then the absolute values of the resultant values may be added to obtain an angle indicator.

This can be simply represented as the following formula.

$$G_{factor} = |G_1 - G_2| + |G_1 - G_3| + |G_1 - G_4| + \ldots + |G_2 - G_3| + |G_2 - G_4| + \ldots$$

($G_{factor}$ is an angle indicator, $G_1, G_2, \ldots, G_n$ are gradients of straight lines that can be generated by touch coordinates, and n is a natural number equal to or greater than 2)

This is explained in detail. If n touch coordinates are created by one touch input, each of the n touch coordinates is connected to a neighboring touch coordinate and thus n−1 straight lines can be created and n−1 gradient values corresponding thereto can be derived. In addition, values obtained by subtracting the gradient values of the straight lines from each other and summing the absolute values thereof may be an angle indicator.

The angle indicator can be represented as the following formula.

$$G_{factor} = \frac{1}{2} \times \sum_{q=1}^{n} \sum_{p=1}^{n} |G_p - G_q|$$

($G_{factor}$ is an angle indicator, $G_1, G_2, \ldots, G_n$ are gradients of straight lines that can be generated by touch coordinates, and n is a natural number equal to or greater than 2)

If touch input is applied in the form of a straight line, the gradients of straight lines that can be created by touch coordinates created by the touch input will be identical or similar. Therefore, the result of calculation of the aforementioned angle indicator $G_{factor}$ will be 0 or a relatively small value. However, if touch input is applied in the form of a curve, the gradients of straight lines that can be created by touch coordinates created by the touch input will have different values. Therefore, the result of calculation of the aforementioned angle indicator $G_{factor}$ will be a larger value than that obtained when the touch input is applied in the form of a straight line.

As described above, it is possible to determine how much the touch input includes straight line parts or curved parts according to the value of the angle indicator, and thus coordinate correction can be adaptively applied.

Figure 5:
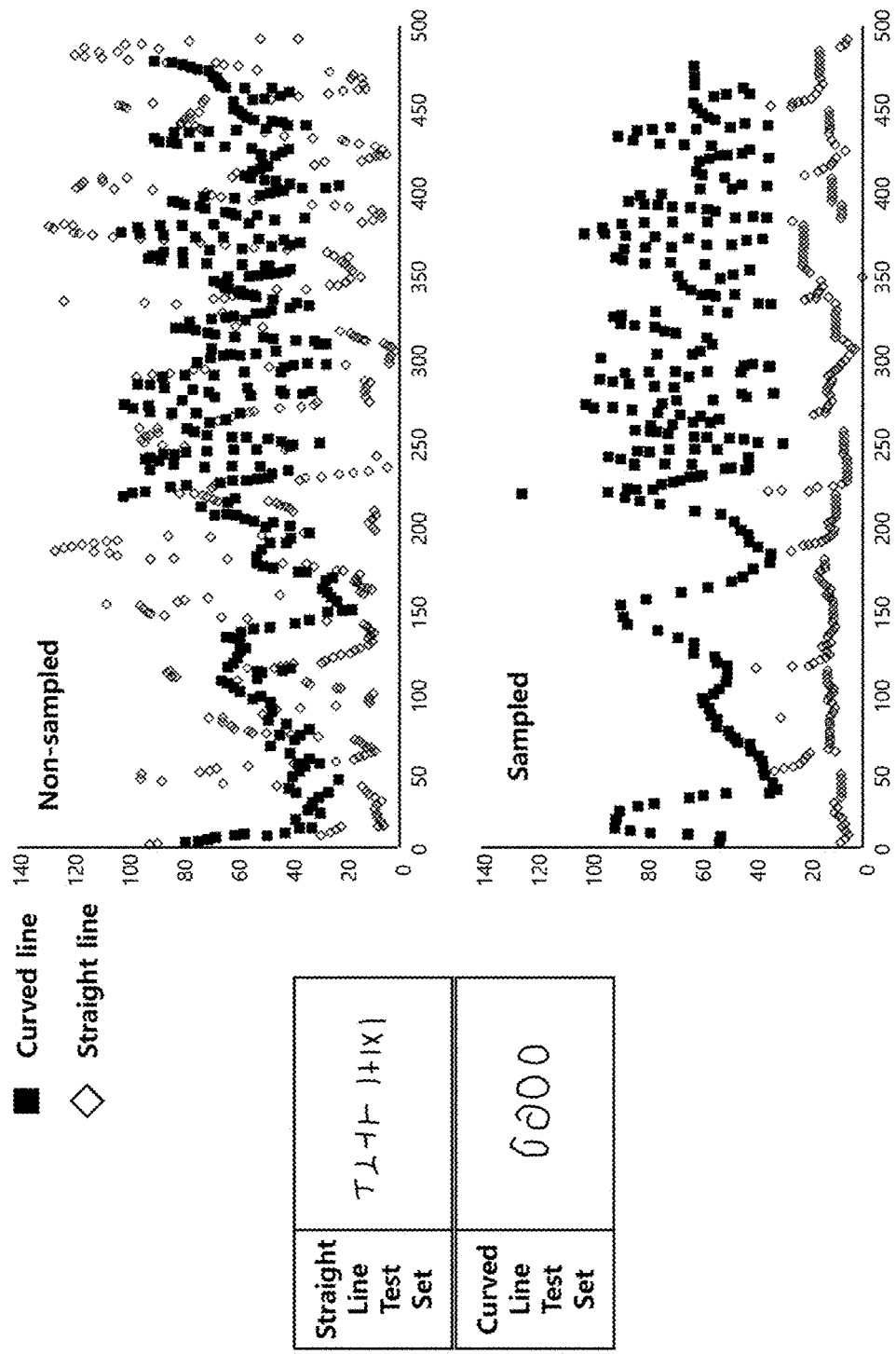
FIG. 5 is a diagram illustrating coordinate correction test results according to the present embodiment.

FIG. 5 is a diagram illustrating coordinate correction test results according to the present embodiment.

In order to measure the reliability of the angle indicator $G_{factor}$ according to the present embodiment for straight lines/circle lines with respect to drawn lines, angle indicators were calculated for a case in which touch coordinates spaced apart by a certain distance range are selected (sampling) and a case in which the touch coordinates are not selected (non-sampling) for straight lines (◇) drawn as straight lines and circle lines (■) drawn as circles.

Here, a line drawn as a straight line means a line drawn by a user with the intention of drawing a straight line and may be a line including noise caused by user's hand tremor rather than a perfect straight line, and a circle line drawn as a circle means a circle line drawn by a user with the intention of drawing a circle and may be a circle line including noise caused by user's hand tremor rather than a perfect circle line.

The graphs shown in FIG. 5 are results of calculating angle indicators using results of drawing the test sets shown in FIG. 5.

When the numerical values of the graphs shown in FIG. 5 are represented as the following table.

TABLE 1

| Line | | Non-Sampling ($G_{factor}$) | Sampling ($G_{factor}$) |
|---|---|---|---|
| Circle line | Average | 55 | 61 |
| Circle line | Maximum | 102 | 145 |
| Straight line | Average | 45 | 13 |
| Straight line | Maximum | 129 | 39 |

For non-sampling touch coordinates, an average angle indicator $G_{factor}$ of 55 and a maximum angle indicator $G_{factor}$ of 102 were calculated for circle lines, and an average angle indicator $G_{factor}$ of 45 and a maximum angle indicator $G_{factor}$ of 129 were calculated for straight lines. It can be ascertained from the non-sampling graph of FIG. 5 that $G_{factor}$ values are not well distinguished between straight lines and circle lines. This may mean that the reliability of distinguishing between straight lines and circle lines is low when the angle indicator $G_{factor}$ is calculated using the non-sampling touch coordinates.

For sampling touch coordinates, an average angle indicator $G_{factor}$ of 61 and a maximum angle indicator $G_{factor}$ of 145 were calculated for circle lines, and an average angle indicator $G_{factor}$ of 13 and a maximum angle indicator $G_{factor}$ of 45 were calculated for straight lines. It can be ascertained from the sampling graph of FIG. 5 that $G_{factor}$ values are relatively well distinguished between straight lines and circle lines. This may mean that the reliability of distinguishing between straight lines and circle lines can be relatively increased when the angle indicator $G_{factor}$ is calculated using the sampling touch coordinates.

Therefore, when touch coordinates spaced apart by a predetermined distance range are selected and then the angle indicator $G_{factor}$ is calculated, the performance of correction can be improved.

Figure 6:
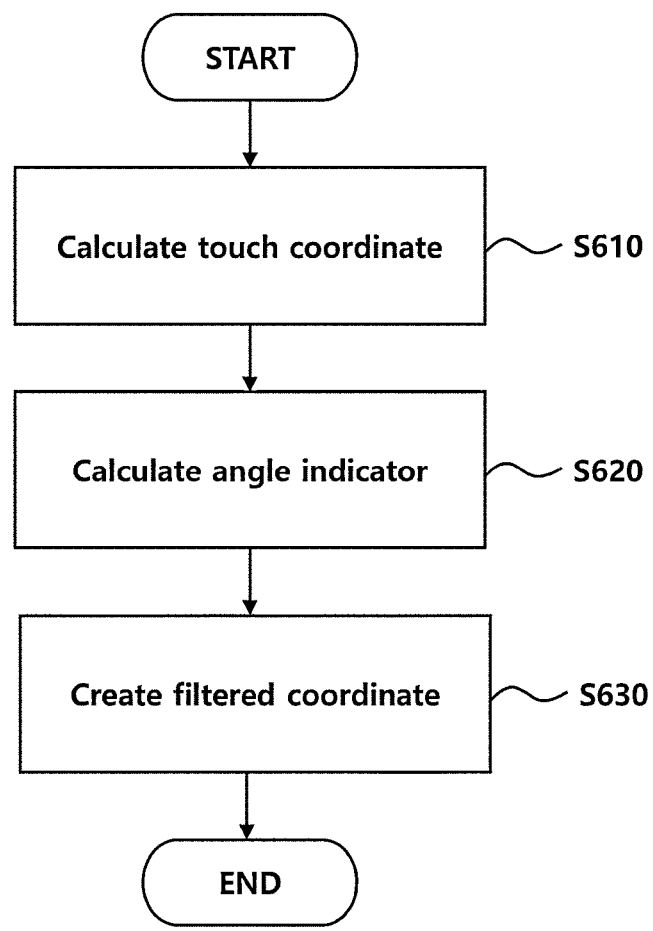
FIG. 6 is a diagram illustrating a coordinate correction method according to the present embodiment.

FIG. 6 is a diagram illustrating a coordinate correction method according to the present embodiment.

In the coordinate correction method according to the present embodiment, step S610 of calculating touch coordinates for a single touch input generated on the touch screen panel may be performed.

A single touch input may mean a touch input that is continuously applied with a user's finger, a touch pen, or the like touching the touch screen panel.

In the coordinate correction method according to the present embodiment, step S620 of calculating gradient values of straight lines generated by connecting neighboring touch coordinates for each touch coordinate to generate an angle indicator may be performed.

If n touch coordinates are created by the single touch input, the n touch coordinates can be connected to neighboring touch coordinates to create n−1 straight lines, and n−1 gradient values corresponding thereto can be derived. In addition, a value obtained by subtracting the gradient values of the straight lines from each other and then summing the absolute values thereof may be an angle indicator.

If the touch input is applied in the form of a straight line, the gradients of the straight lines that can be created by touch coordinates created by the touch input will be identical or similar. Therefore, the angle indicator $G_{factor}$ calculated according to the above-described angle indicator calculation will be 0 or a relatively small value. However, if the touch input is applied in the form of a curve, the gradients of the straight lines that can be created by the touch coordinates created by the touch input will have different values. Therefore, the angle indicator $G_{factor}$ calculated according to the above-described angle indicator calculation will be larger than that calculated when the touch input is applied in the form of a straight line.

As described above, it is possible to determine how much touch input includes straight line parts or curved parts according to the value of the angle indicator, and thus coordinate correction can be adaptively applied.

In the coordinate correction method according to the present embodiment, step S630 of generating angle filtered coordinates for the touch coordinates by correcting the touch coordinates according to the value of the angle indicator may be performed.

By adaptively and flexibly correcting the touch coordinates according to the value of the angle indicator, a degree to which the coordinates are corrected can be increased for a straight line with a small angle indicator and can be decreased for a curve with a large angle indicator.

In the coordinate correction method according to the present embodiment, the step of generating distance filtered coordinates by correcting the angle filtered coordinates depending on the distances of the angle filtered coordinates may be additionally performed. Here, the angle filtered coordinates obtained by correcting the touch coordinates according to the angle indicator are corrected once again depending on the distance between coordinates, and a correction degree may be decreased as the distance between angle filtered coordinates increases and may be increased as the distance decreases.

The coordinate correction method for correcting coordinates depending on a distance between coordinates will be described in detail in a first embodiment of touch coordinate correction.

Figure 7:
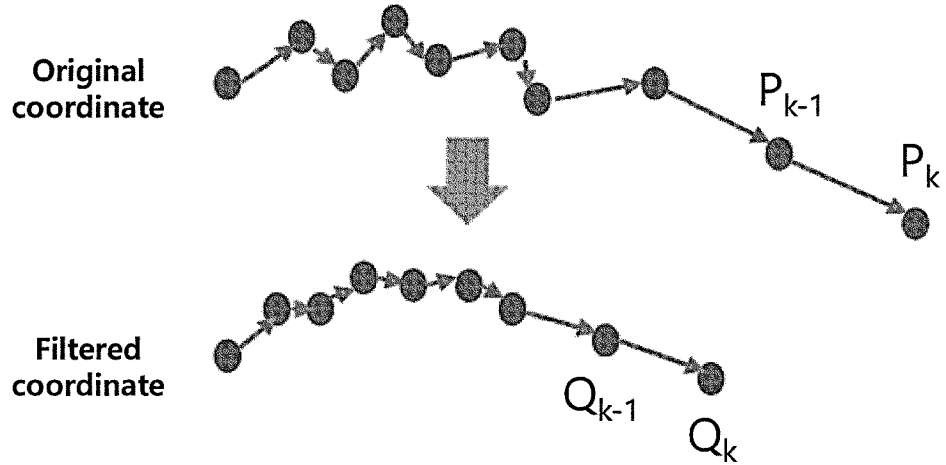
FIG. 7 is a diagram illustrating a first embodiment of touch coordinate correction.

FIG. 7 is a diagram illustrating the first embodiment of touch coordinate correction.

The first embodiment shown in FIG. 4 illustrates a method of generating filtered coordinates by correcting touch coordinates based on the distance between touch coordinates.

As shown in FIG. 4, a (k−1)-th touch coordinate $P_{k-1}$ and a k-th touch coordinate $P_k$ which have been input can be corrected to a (k−1)-th filtered coordinate $Q_{k-1}$ and a k-th filtered coordinate $Q_k$.

The touch coordinate $P_k$ can be corrected to the filtered coordinate $Q_k$ through the following formula.

$$Q_k=(1-\alpha)\times Q_{k-1}+\alpha\times P_k$$

($\alpha$ is a coefficient.)

Here, the coefficient $\alpha$ may vary depending on the distance between the (k−1)-th touch coordinate $P_{k-1}$ and the k-th touch coordinate $P_k$, and specifically, the coefficient $\alpha$ of the above formula may increase as the distance between the (k−1)-th touch coordinate $P_{k-1}$ and the k-th touch coordinate $P_k$ increases and may decrease as the distance between the (k−1)-th touch coordinate $P_{k-1}$ and the k-th touch coordinate $P_k$ decreases.

Therefore, considering that the touch coordinate Pk is corrected to the filtered coordinate $Q_k$, the correction degree may decrease as the distance between the (k−1)-th touch coordinate $P_{k-1}$ and the k-th touch coordinate $P_k$ increases and may increase as the distance between the (k−1)-th touch coordinate $P_{k-1}$ and the k-th touch coordinate $P_k$ decreases.

In addition, the distance between touch coordinates may vary depending on a user's drawing speed. That is, if the user's drawing speed is high, the distance between touch coordinates may be long and thus correction of touch coordinates according to the first embodiment may be weakly performed, and if the user's drawing speed is low, the distance between touch coordinates may be short and thus correction of touch coordinates according to the first embodiment may be strongly performed.

The first embodiment can be used along with coordinate correction using an angle indicator according to the present embodiment. Specifically, touch coordinates may be corrected using an angle indicator according to the present embodiment, and then the filtered coordinates created using the angle indicator may be corrected again according to the coordinate correction method using a distance between coordinates according to the first embodiment. Alternatively, touch coordinates may be corrected according to the coordinate correction method using a distance between coordinates according to the first embodiment, and then the created filtered coordinates may be corrected again according to the coordinate correction method using an angle indicator according to the present embodiment.

Coordinates corrected according to the first embodiment may also be referred to as distance filtered coordinates.

Figure 8:
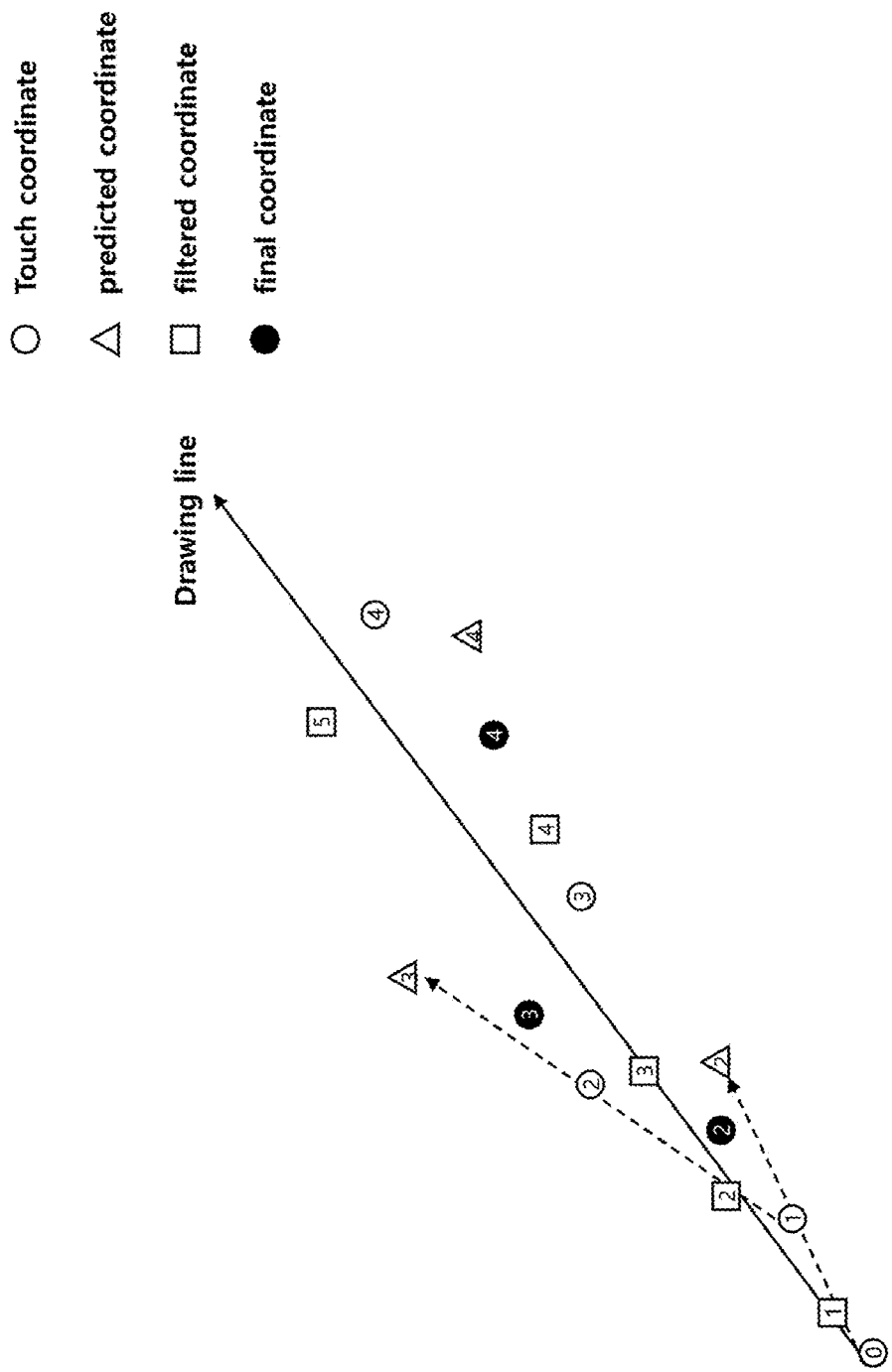
FIG. 8 is a diagram illustrating a second embodiment of touch coordinate correction.

FIG. 8 is a diagram illustrating a second embodiment of touch coordinate correction.

The second embodiment shown in FIG. 8 illustrates a method of generating predicted coordinates and correcting coordinates based thereon to create final coordinates. Filtered coordinates are used when the second embodiment is implemented, and these filtered coordinates may be obtained by coordinate correction using an angle indicator according to the present embodiment or may be obtained by coordinate correction using a distance between coordinates according to the first embodiment.

The second embodiment may include touch coordinates (○), predicted coordinates (Δ), filtered coordinates (□), and final coordinates (●).

Specifically, as shown in FIG. 8, a 0-th touch coordinate, a first touch coordinate, a second touch coordinate, a third touch coordinate, and a fourth touch coordinate may be sequentially created according to user's touch input.

Then, coordinate correction using an angle indicator according to the present embodiment or the coordinate correction method using a distance between coordinates according to the first embodiment may be performed on the touch coordinates to create a first filtered coordinate, a second filtered coordinate, a third filtered coordinate, and a fourth filtered coordinate. That is, as filtered coordinates according to the second embodiment, angle filtered coordinates or distance filtered coordinates may be used.

In addition, a second predicted coordinate, a third predicted coordinate, and a fourth predicted coordinate may be created. The second predicted coordinate may be created on a straight line in the direction of touch input in which the 0-th touch coordinate and the first touch coordinate are positioned. The distance between the second predicted coordinate and the first touch coordinate is not particularly limited, but may be the same as the distance between the 0-th touch coordinate and the first touch coordinate, or may be shorter or longer than the distance between the 0-th touch coordinate and the first touch coordinate. In this way, the third predicted coordinate may be created on a straight line on which the first touch coordinate and the second touch coordinate are positioned, and the fourth predicted coordinate may be created on a straight line on which the second touch coordinate and the third touch coordinate are positioned. A method of generating predicted coordinates in this way may be referred to as extrapolation.

Then, final coordinates may be created using the predicted coordinates and the filtered coordinates according to the following formula.

$$P_k^{final}=\beta\times P_k^{predict}+(1-\beta)\times P_k^{filtered}$$

($P_k^{final}$ is a k-th final coordinate, $P_k^{predict}$ is a k-th predicted coordinate, $P_k^{filtered}$ is a k-th filtered coordinate, and $\beta$ is a coefficient)

Therefore, referring to FIG. 8, the second final coordinate can be created using the second filtered coordinate and the second predicted coordinate, the third final coordinate can be created using the third filtered coordinate and the third predicted coordinate, and the fourth final coordinate can be created using the fourth filtered coordinate and the fourth predicted coordinate.

According to the second embodiment, a user predicts a direction in which the user will draw a line in advance and corrects touch coordinates based thereon using predicted coordinates, and thus latency performance in drawing is improved and feeling of close contact during drawing is improved.

What is claimed is:

1. A touch sensing device comprising:
    a coordinate calculation circuit for calculating touch coordinates for a single touch input generated on a touch screen panel;
    an indicator generation circuit for generating an angle indicator by calculating a gradient value of a straight line created by connecting two neighboring touch coordinates among the touch coordinates; and
    a coordinate correction circuit for generating a filtered coordinate for each touch coordinate by correcting the touch coordinate according to a value of the angle indicator,
    wherein the value of the angle indicator is generated by calculating gradient values of straight lines generated by connecting one of the touch coordinates and another coordinate for each of the touch coordinates,
    subtracting the gradient values of straight lines from each other, and
    adding absolute values of resultant values obtained by the subtracting the gradient values of straight lines from each other.

2. The touch sensing device of claim 1, wherein the indicator generation circuit selects touch coordinates, spaced apart by a distance within a predetermined distance range, from among the touch coordinates and then calculates the gradient value using the selected touch coordinates.

3. The touch sensing device of claim 1, wherein a degree, to which the touch coordinates are corrected, decreases as the value of the angle indicator increases and the degree increases as the value of the angle indicator decreases.

4. The touch sensing device of claim 1, wherein the filtered coordinates are output on a display panel in an order of generation and displayed as one line.

5. The touch sensing device of claim 1, further comprising a transmission circuit for transmitting the filtered coordinates to a host.

6. The touch sensing device of claim 1, wherein the angle indicator has a value according to Formula (1):

$$G_{factor} = \frac{1}{2} \times \sum_{q=1}^{n}\sum_{p=1}^{n}|G_p - G_q|$$

($G_{factor}$ is an angle indicator, $G_1, G_2, \ldots, G_n$ are gradients of straight lines that are able to be created by touch coordinates and n is a natural number equal to or greater than 2).

7. A touch sensing device comprising:
a coordinate calculation circuit for calculating touch coordinates for a single touch input generated on a touch screen panel;
an indicator generation circuit for generating an angle indicator by calculating a gradient value of a straight line created by connecting two neighboring touch coordinates; and
a coordinate correction circuit for generating a filtered coordinate by correcting a second coordinate using a first coordinate corresponding to a reference coordinate, a first weight to be multiplied by the first coordinate, the second coordinate belonging to the touch coordinates, and a second weight to be multiplied by the second coordinate, wherein values of the first weight and the second weight vary according to a value of the angle indicator,
wherein the value of the angle indicator is generated by calculating gradient values of straight lines generated by connecting one of the touch coordinates and another coordinate for each of the touch coordinates,
subtracting the gradient values of straight lines from each other, and
adding absolute values of resultant values obtained by the subtracting the gradient values of straight lines from each other.

8. The touch sensing device of claim 7, wherein the reference coordinate is a coordinate, corrected according to the value of the angle indictor, from among the touch coordinates.

9. The touch sensing device of claim 7, wherein a sum of the first weight and the second weight is 1, the first weight decreases and the second weight increases as the value of the angle indicator increases, and the first weight increases and the second weight decreases as the value of the angle indicator decreases.

10. The touch sensing device of claim 7, wherein the angle indicator has a value according to Formula (1):

$$G_{factor} = \frac{1}{2} \times \sum_{q=1}^{n}\sum_{p=1}^{n}|G_p - G_q|$$

($G_{factor}$ is an angle indicator, $G_1, G_2, \ldots, G_n$ are gradients of straight lines that are able to be created by touch coordinates and n is a natural number equal to or greater than 2).

11. A coordinate correction method comprising:
calculating touch coordinates for a single touch input generated on a touch screen panel;
generating an angle indicator by calculating a gradient value of a straight line created by connecting two neighboring touch coordinates; and
generating an angle filtered coordinate for each touch coordinate by correcting the touch coordinate according to a value of the angle indicator,
wherein the value of the angle indicator is generated by calculating gradient values of straight lines generated by connecting one of the touch coordinates and another coordinate for each of the touch coordinates,
subtracting the gradient values of straight lines from each other, and
adding absolute values of resultant values obtained by the subtracting the gradient values of straight lines from each other.

12. The coordinate correction method of claim 11, wherein a degree, to which the angle filtered coordinates are corrected, decreases as the angle indicator increases and the degree increases as the angle indicator decreases.

13. The coordinate correction method of claim 11, further comprising generating a distance filtered coordinate by correcting each angle filtered coordinate according to a distance between the angle filtered coordinates.

14. The coordinate correction method of claim 13, wherein a degree, to which the distance filtered coordinates are corrected, decreases as the distance between the angle filtered coordinates increase and the degree increases as the distance decreases.

15. The coordinate correction method of claim 13, wherein the distance filtered coordinates are output, in an order of generation, on a display panel including the touch screen panel and displayed as one line.

16. The coordinate correction method of claim 11, further comprising selecting any two coordinates from among the angle filtered coordinates to generate predicted coordinates respectively corresponding to the angle filtered coordinates through extrapolation and generating final coordinates using the angle filtered coordinates and the predicted coordinates.

17. The coordinate correction method of claim 11, wherein the angle indicator has a value according to Formula (1):

$$G_{factor} = \frac{1}{2} \times \sum_{q=1}^{n}\sum_{p=1}^{n}|G_p - G_q|$$

($G_{factor}$ is an angle indicator, $G_1, G_2, \ldots, G_n$ are gradients of straight lines that are able to be created by touch coordinates and n is a natural number equal to or greater than 2).

* * * * *